United States Patent

[11] 3,578,214

[72] Inventor Frank M. Iannelli
    5 Penwood Road, Livingston, N.J. 07039
[21] Appl. No. 797,462
[22] Filed Feb. 7, 1969
[45] Patented May 11, 1971

[54] CARBONATOR
    5 Claims, 14 Drawing Figs.
[52] U.S. Cl. .................................................. 222/129.1,
    222/394, 261/21
[51] Int. Cl. .................................................. B67d 5/56
[50] Field of Search ........................................ 222/190,
    129.1, 129.3, 129.4, 394; 261/21, (Carbonator Digest); 261/160

[56] References Cited
    UNITED STATES PATENTS
2,809,597  10/1957  Fowler ........................ 261/160X
3,337,197  8/1967   Iannelli ....................... 261/160

Primary Examiner—Robert B. Reeves
Assistant Examiner—H. S. Lane
Attorney—Harry B. Rook ABSTRACT: Liquid to be carbonated flows under its normal pressure into a combined reservoir and precarbonating chamber and is forced from said chamber by carbonating gas into a combined mixing and dispensing chamber. The supply of carbonating gas to said reservoir and carbonating chamber is controlled by an electromagnetic valve which is actuated by a float-operated switch in accordance with variations in the liquid level in the mixing and dispensing chamber. Constant gas pressure is supplied through a restricted duct to the mixing and dispensing chamber so that if the chamber empties and the switch cuts off the gas supply, resumption of the flow of water into said chamber is automatically effected by simply holding the dispensing valve open to reduce the pressure so as to allow the water to flow in until the float closes the switch to cause restoration of the gas pressure.

Patented May 11, 1971

INVENTOR.
Frank M. Iannelli
BY
ATTORNEY

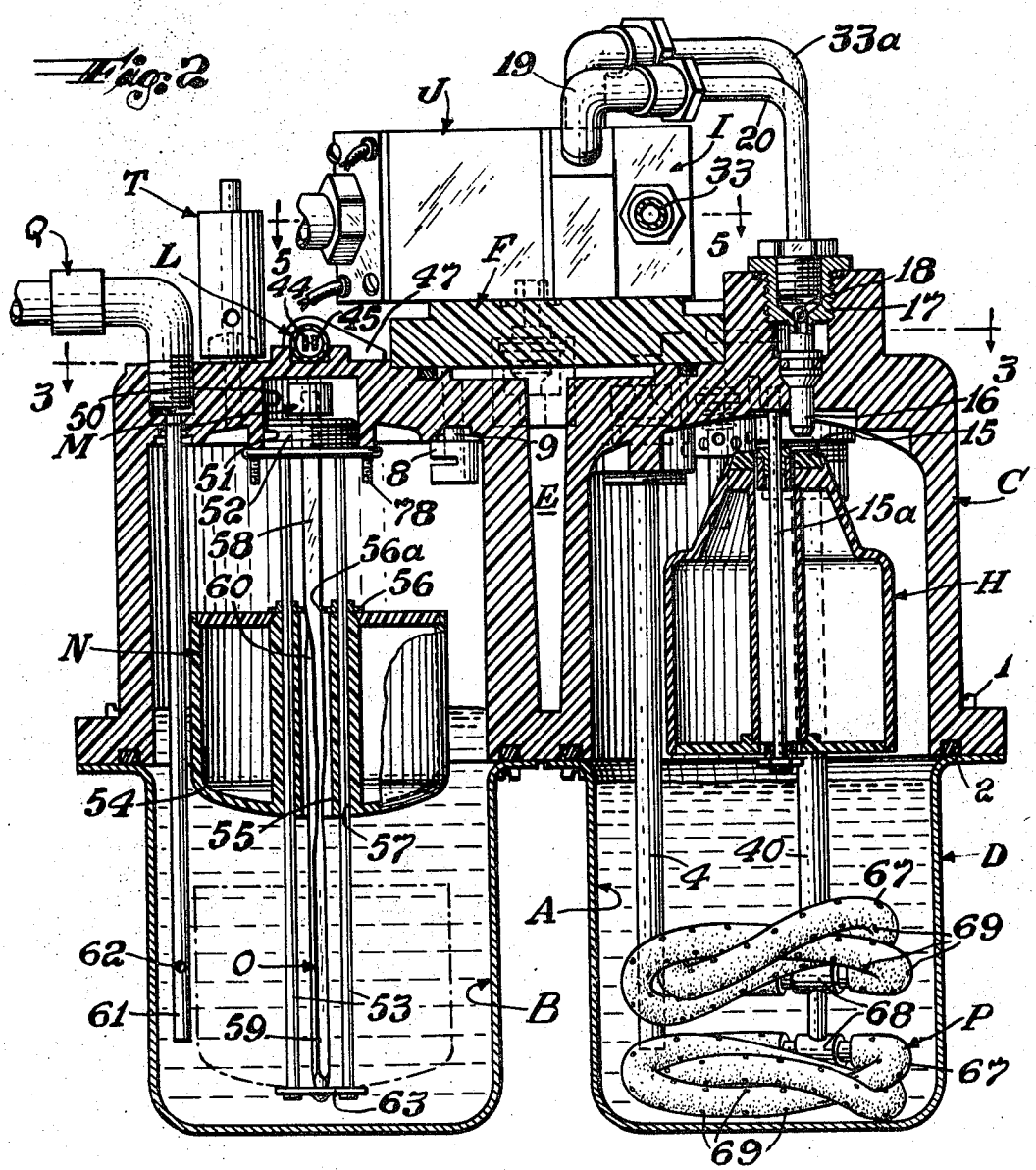
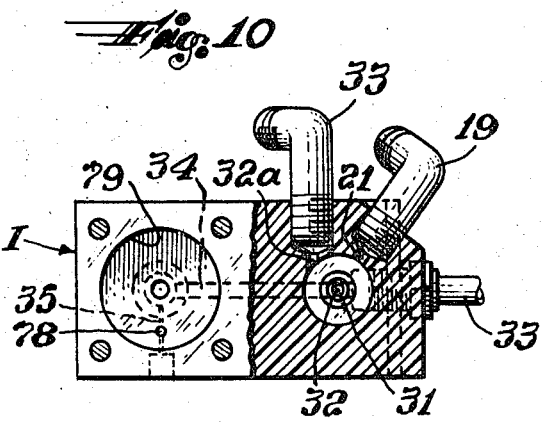
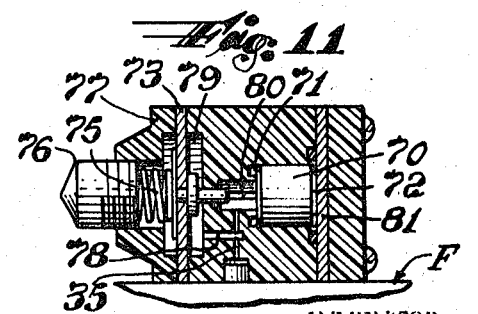

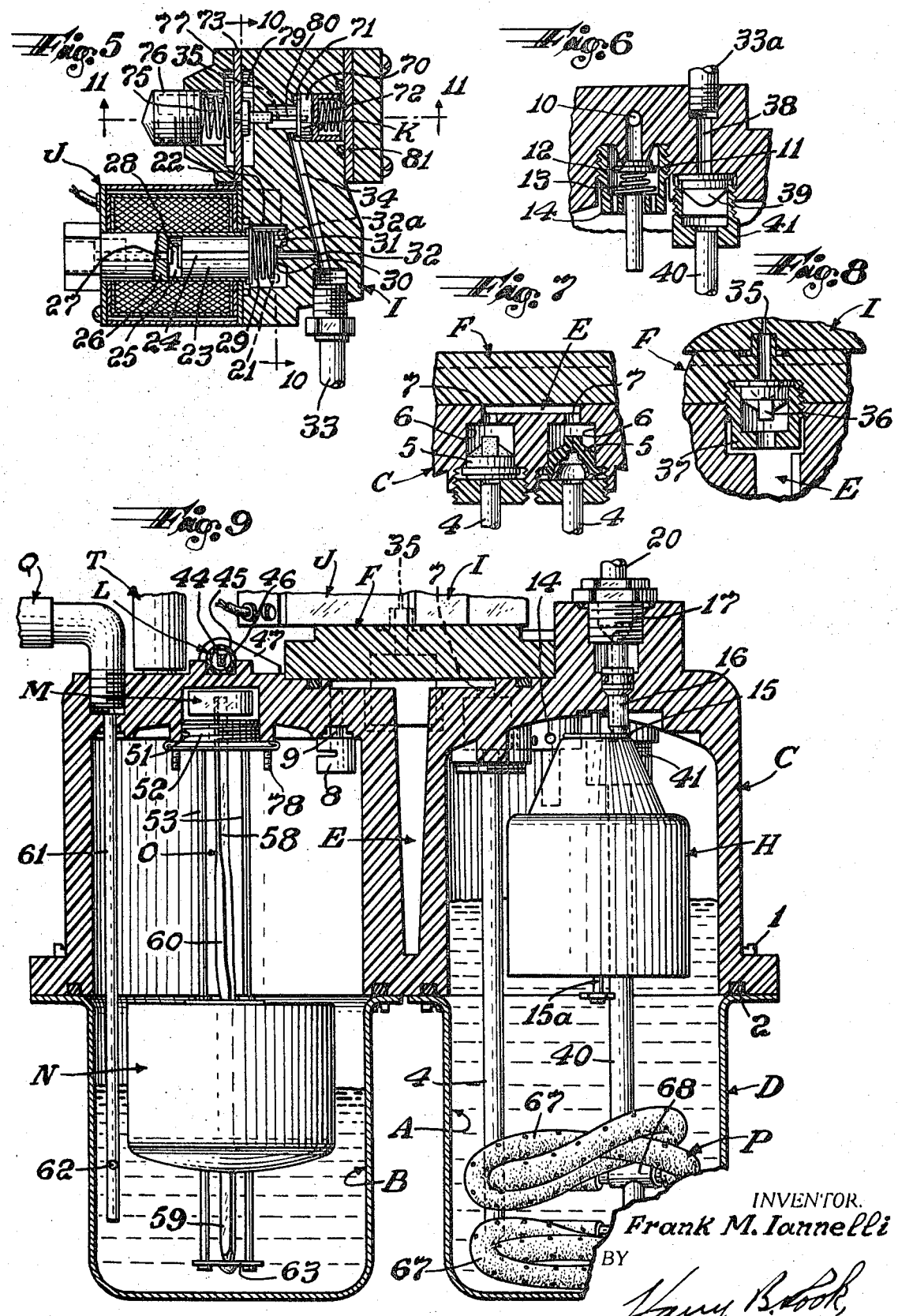

CARBONATOR

BACKGROUND OF THE INVENTION

1. Field of the Invention

This invention relates to carbonators wherein the liquid to be carbonated and the carbonated mixture are circulated through the apparatus by the carbonating gas itself so as to eliminate motor driven liquid pumps.

2. The Prior Art

Such apparatus is known wherein water or other liquid flows from its source, such as a city water supply, under normal pressure into a combined reservoir and precarbonating chamber and is forced from said chamber by the gas itself into a combined mixing and dispensing chamber, the supply of carbonating gas to both said chambers being controlled by an electromagnetic valve which is controlled by a switch operated by a float in the mixing and dispensing chamber. The supply of carbonating gas is automatically shut off if the supply of water to be carbonated is interrupted or if the carbonated mixture in the mixing and dispensing chamber is depleted by withdrawal from the chamber faster than it can be replaced by water from the reservoir. When the gas is shut off, the water flows into the apparatus from the supply and, unless carefully watched, may continue to flow until the float is elevated to the point where the switch is again opened and the gas supply is shut off. Then in order to resume operation of the apparatus it has been necessary to manually close the switch.

SUMMARY

In accordance with the invention, a constant pressure, for example, 60 p.s.i. is supplied through a restricted duct to the mixing and dispensing chamber so that if water fails to enter the apparatus from the source, or if carbonated mixture is depleted from the dispensing chamber by withdrawing the mixture faster than it can be replaced by water from the reservoir, the float-operated switch will be opened to cut off the gas supply and cause the reservoir to vent and thereby allow the water to enter the reservoir from the source. The dispensing valve is held open and the 60 lb. gas pressure is quickly reduced to near zero because the inflow of gas is impeded by the restricted duct and therefore the water flows from the reservoir into the mixing and dispensing chamber until the water level rises sufficiently to cause closure of the float-operated switch and the consequent restoration of the gas supply to the apparatus. Then the dispensing valve is closed and normal operation or cycling of the apparatus is resumed.

BRIEF DESCRIPTION OF THE DRAWINGS

For a more complete understanding of the invention, reference should be had to the accompanying drawings in which:

FIG. 2 is a central vertical view approximately on the plane of the line 2—2 of FIG. 1, showing the parts in their positions during the flow of water from the city supply into the reservoir and precarbonating chamber;

FIG. 5 is an enlarged fragmentary horizontal sectional view on the plane of the line 5—5 of FIG. 2;

FIGS. 6, 7 and 8 are fragmentary vertical sectional views on the planes of the lines 6—6, 7—7 and 8—8, respectively, of FIG. 3, also showing parts that are omitted in FIG. 3;

FIG. 9 is a view similar to FIG. 2 with portions omitted and showing the positions of the several parts during the forcing of the precarbonating liquid from the reservoir and precarbonating chamber into the mixing and dispensing chamber;

FIG. 10 is a vertical sectional view approximately on the plane of the line 10—10 of FIG. 5 with parts omitted for clearness in illustration;

FIG. 11 is a fragmentary vertical sectional view on the plane of the line 11—11 of FIG. 5;

DESCRIPTION OF THE PREFERRED EMBODIMENTS

Figure 1:
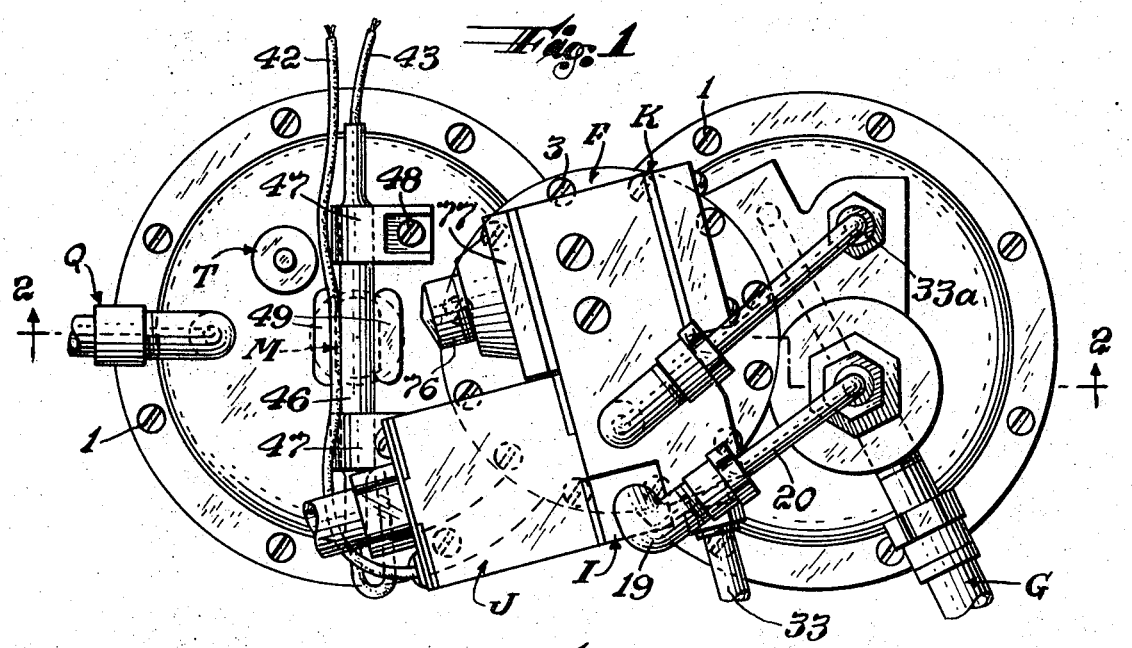
FIG. 1 is a top plan view of the apparatus with portions broken away for clearness of illustration.

Specifically describing the invention, the reference characters A and B designate, respectively, the combination mixing and dispensing chamber. These chambers are shown as generally cylindrical in shape and are preferably formed of a housing section C molded of a synthetic resin having a cavity for each chamber and to which are secured in liquid-tight relation thereto by screws 1 and packing rings 2, cuplike sections D, one for each chamber. This construction provides an electrically insulated main section C for easy and quick attaching and detaching of the sections D for access to the parts in the chambers and for cleaning the chambers. The section C is also formed with a carbonating recess E between said chambers, the upper end of which is closed by a cap plate F secured by screws 3.

The carbonating recess E communicates at one side with the chamber A by tubes 4 through normally closed slit rubber check valves 5, best shown in FIG. 7, that open under the pressure of the liquid from the chamber A. The valves 5 are mounted in recesses 6 in the top wall of the housing section C, and ports 7 lead from said recesses to the carbonating recess E. At its other side the carbonating recess E communicates with the chamber B through two slotted spray heads 8 each of which is connected by a tube 9 to the carbonating recess E.

Water or liquid to be carbonated from a suitable source and under suitable pressure, for example water from a city water supply at twenty p.s.i. enters the apparatus from a pipe G and through a duct 10 in the top wall of the housing to a spring closed check valve 11 (FIG. 6) that is normally pressed against its seat 12 by a spring 13 interposed between the valve and one end of a perforated cup-shaped casing 14 that is screwed into the top wall of the housing. The valve 11 opens under pressure of the incoming water to permit the water to flow into the chamber A. While the gas therein is vented therefrom, such flow of the water continues until it is stopped by a float H vertically reciprocable in the chamber on a rod 15a, which has a valve seat 15 engaging the end of a vent tube 16 which is carried by a bushing 17 screwed into the outer side of the top wall of the housing and having therein a gravity-closed ball check valve 18 that opens under pressure of the air forced out of the chamber A by the incoming water. The bushing is connected by an elbow 19 and tube 20 to a vent passage 21 in a block I secured to the cap plate F. This passage leads to a valve chamber 22 into which projects the core 23 of the electromagnetic valve unit J, which has longitudinal external slots 24 that open into a space 25 between the core and its casing 26 through which extends a vent hole 27 that opens to the atmosphere. The hole 27 is opened and closed by a valve disc 28 on the end of the core which is normally held in a positioning to open the vent hole by a compression spring 29 which normally biases the core so as to hold a second valve disc 30 on the other end of the core against a valve seat 31. The valve 30, 31 controls the flow of high pressure carbonating gas into the chamber 22 from an inlet duct 32 which is connected by pipe 33 to a supply of carbonating gas under high pressure, for example 130 p.s.i. When the solenoid of the electromagnetic valve unit J is energized, the core 23 is actuated so as to close the air vent opening 27 and at the same time open the valve 30, 31 to admit high pressure gas into the apparatus.

The high pressure gas flows through the passage 21 (FIGS. 5 and 10) into a duct 32a which is connected by tube 33a to the gas inlet and precarbonating head of the chamber A and the high pressure gas also flows directly from the supply pipe 33 through another passage 34 to a pressure regulating valve assembly K by which the pressure is reduced, for example to 60 p.s.i., and flows through a restricted duct 35 FIGS. 5, 8, 10 and 11) and a slitted rubber check valve 36 into the carbonating recess E which is part of the inlet passage of the chamber B. The high pressure gas tube 33 is connected to a duct 38 in the top wall of the housing C (FIG. 6) and through a slitted rubber check valve 39 to the high pressure gas inlet pipe 40 of the chamber A to which is connected the carbonating head P. The valve 39 is arranged in a cup-shaped casing 41 into the housing C and has the pipe 40 connected thereto. The valve 36 is shown (FIG. 8) as mounted in a cup-shaped casing 37 that is screwed into the cap plate F, and the valve opens under the incoming gas pressure and automatically closes when the pressure is relieved. With this arrangement the mixing and dispensing chamber B has a constant supply of gas at a pressure of, for example 60 p.s.i., while the high gas pressure supplied to the reservoir-carbonating chamber A is under the control of the electromagnetic valve unit J.

The circuit through the solenoid of the electromagnetic valve unit J is controlled by a normally open switch L connected in series circuit with the solenoid and a source of electricity and actuated into closed positions by a permanent bar magnet M which is in turn rotated by coaction of a float N in the chamber B and a helically twisted rod O to one end of which the magnet M is connected intermediate the ends of the magnet. A magnetically operated switch of this character is shown and described in U.S. Pat. No. 3,283,095 dated Nov. 1, 1966.

Figure 3:
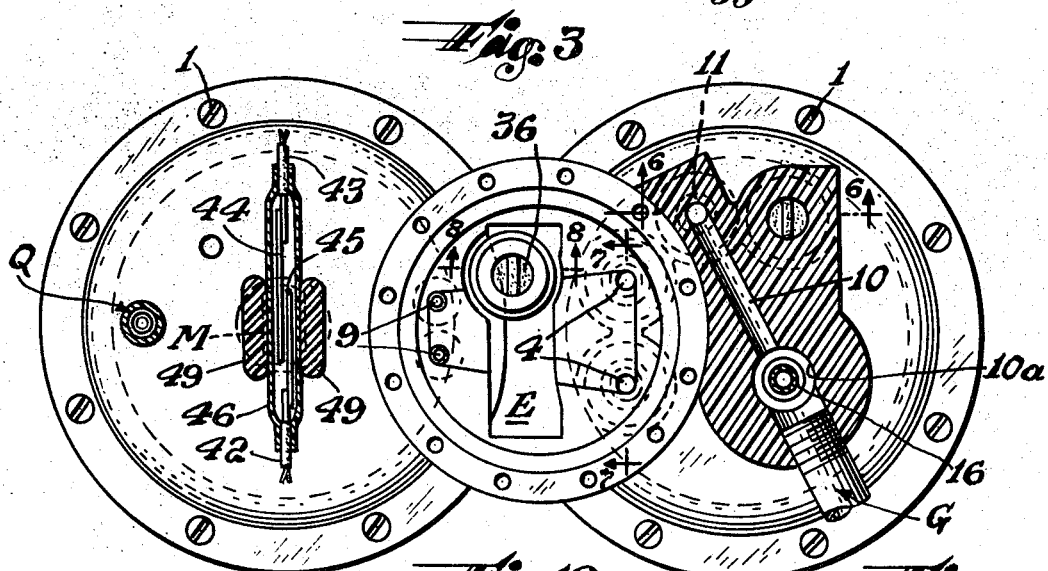
FIG. 3 is a horizontal sectional view approximately on the plane of the line 3—3 of FIG. 2.
Figures 4, 12, 12A, 12B:
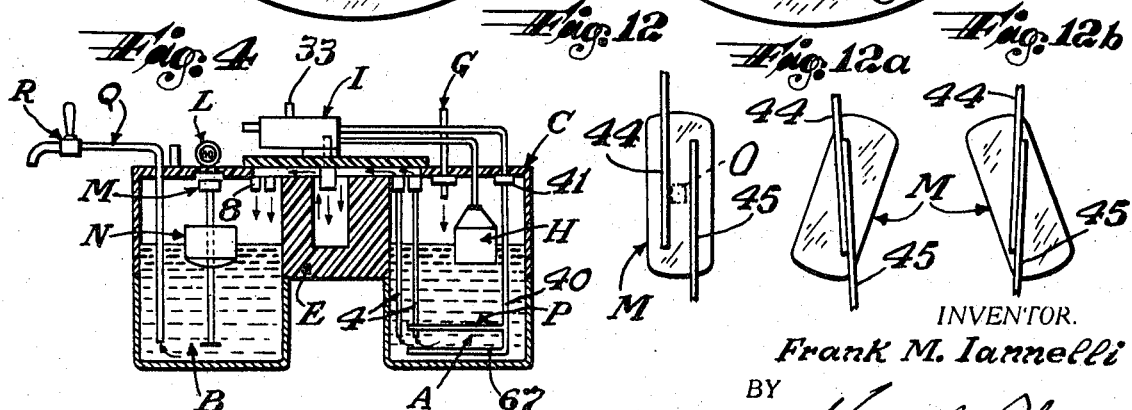
FIG. 4 is a schematic sectional and elevational view of the apparatus on a reduced scale.
FIG. 12 is an enlarged fragmentary plan of the permanent bar magnet and portions of the switch contacts of the float-operated switch, showing the parts in the neutral or switch-opening position.
FIG. 12a is a similar view showing the magnet rotated in one direction to close the switch.
FIG. 12b is a similar view showing the magnet rotated in the opposite direction to close the switch.

Wires 42 and 43 from the solenoid extend to the external fixed ends of the respective resilient magnetic leaf switch contacts 44 and 45 of the switch L. The free ends of said leaf contacts are normally separated as shown in FIGS. 3 and 2 but may be magnetically brought together or closed (FIG. 9) or allowed to separate or to open, upon turning of the permanent bar magnet M on the axis of the rod O as shown in FIGS. 12 and 12a. The magnet is exposed closely beneath the leaf contacts but separate therefrom by the top wall of the housing section C. The leaf contacts are shown as mounted in a plastic tube or housing 46 in the opposite ends of which the leaf contacts are sealed as shown in FIG. 3. The tube 46 is held in place in any suitable manner, for example by clips 47 held in place on the top wall of the housing by screws 48. Spaced apart upstanding lugs 49 on the housing provide a socket between them for the plastic tube 46.

The housing top wall has a downwardly opening recess 50 the lower interior portion of which threaded as indicated at 51 and adjustably receives a screw-threaded mounting fitting 52 for rods 53 that slidably support the float N. The lower ends of the rods are rigidly fixedly connected together for example, by a plate 63. Both the housing section C and the fitting 52, like the tube 46, are formed of nonmagnetic electrical insulating material. For mounting the float on the rods, the float is shown as formed with a buoyant hollow body 54 and has a central opening 55. At the upper end of the body the central opening 55 is bridged by a plate 56 rigidly secured to the body and having a rectangular aperture 56a through which the rod O relatively slidably extends. The body also has openings 57 parallel to the opening 55, through each of which extends one of the rods 53. To rotate the bar magnet M, the actuating rod O is preferably square in a cross section and is twisted into helical form along portions of its length to provide the respective upper and lower helical portions 58 and 59 being twisted in opposite directions from the intermediate portion 60. The parts are so arranged and mounted that when the float body 54 is at its upper position the movement of the apertured plate 56 by the float relative to the rod O, will move the magnet M so that the leaf contacts 45 will be separated to break the circuit through the solenoid J. Movement of the float downwardly along the intermediate portion 60 of the rod will rotate the magnet to effect movement of the contacts together to close said circuit. Further descent of the float will then, through the lower twisted portion 59 of the rod O, rotate the magnet to its original position so that the circuit is again opened through the solenoid. When the circuit through the solenoid is open as shown in FIG. 2 the supply of carbonating gas is cut off, while when the circuit is closed as shown in FIG. 9, carbonating gas is admitted into the apparatus.

The carbonated liquid to be dispensed from the chamber B leaves the chamber through an outlet tube 61 that depends into the chamber from the top wall of the housing and is connected at its upper end to a discharge pipe Q which may have a suitable valve or faucet R as shown in FIG. 4.

In operation of the apparatus so far described, assuming the chambers A and B are empty and the floats H and N are at their lowest positions, the electrical and gas connections are first made and then the water or other liquid to be carbonated is allowed to flow under, for example the city pressure, into the reservoir and precarbonating chamber A through the valve 11, 12. During this operation the air in the chamber is permitted to escape through the vent tube 16, check valve 18, passage 21, vent grooves 24 in the solenoid core and the vent hole 27 (FIG. 5). When the liquid has reached a predetermined level, the float H is elevated so that valve seat 15 on the float engages the end of the tube 16 and closes the vent, after which the liquid flows through tubes 4 into the carbonating recess and thence through tubes 9 and spray heads 8, which constitute an inlet passage, into the mixing and dispensing chamber B. During this operation the carbonating gas supply is cut off at valve 30, 31. When the liquid level in chamber B rises and the float N moves along the portion 60 of the rod O, the float actuates the magnet M to close the switch L and energize the solenoid which opens the valve 30, 31 to permit influx of carbonating gas at high pressure, about 135 p.s.i., to the chamber A. At the same time carbonating gas is constantly or continually admitted through the pressure reducing valve K to the carbonating chamber E at a pressure of around 60 p.s.i. The high pressure in chamber A forces additional liquid into chamber B causing float H to descend and float N to rise and actuate the switch into "off" position and thereby cut off the gas supply to chamber A. The pressure of the gas in chamber A is such as to prevent influx of liquid from the supply at a pressure of, for example 20 to 40 lbs., but when the supply of gas is shut off by the solenoid valve 30, 31, the vent of the chamber A is opened through the vent passages 24, 27 (FIG. 5), and then the pressure drops in chamber A and liquid from the source will enter the chamber until the level rises high enough to again close the float valve 15, 16. Then both chambers have the normal or predetermined quantities of liquid therein to begin normal carbonating operation, and when the completely carbonating liquid is drawn from the chamber B through discharge pipe Q, float N will descend into the position shown in FIG. 9 so as to close the switch L and again open the solenoid valve so as to supply carbonating gas to the chamber A, it being understood that the liquid flows from the mixing and dispensing chamber B through the discharge pipe under the gas pressure in the chamber.

If water fails to enter the apparatus from the source through chamber A, or if the carbonated liquid is withdrawn from chamber B faster than it an be replaced by water from the chamber A, the float N descend to its lower most position shown by dot and dash lines in FIG. 2 so as to open the switch L and cut off the supply of gas to the chamber A. The gas in the reservoir chamber A will then be vented through the vent C and water will flow into the chamber form the source. The dispensing valve R is held open and the 60 p.s.i. gas pressure is quickly reduced to near zero because the inflow of gas is impeded by the restricted duct 35, and therefore the water flows from the reservoir chamber A under the source pressure of for example 20 p.s.i. into the mixing and dispensing chamber B until the water level rises sufficiently to raise the float and thus cause closure of the switch L and the consequent restoration of the gas supply to the reservoir-carbonating chamber A. During this operation, when the water level rises in chamber B to the entrance end of the dispensing pipe 61, outflow of the gas is permitted to continue momentarily through the hole 62 in the discharge pipe 61 above the entrance end of the pipe until the water has raised the float a sufficient distance to cause closure of the switch L; and when the water level rises above the hole 62, the carbonated liquid in the chamber B is again subjected to the full gas pressure of 60 p.s.i. to cause outflow of the liquid each time the discharge valve is opened.

To avoid the possibility of excessive pressure accumulating in the chamber B, a known type of spring closed relief valve T may be utilized having its inlet connected to the chamber and its outlet to the atmosphere.

A carbonating head P is shown as comprising two irregularly coiled or looped tubes 67 each having its opposite ends connected by a T-fitting 68 to the high pressure gas supply pipe 40, the coiled pipes having a large number of minute apertures 69 through which jets of carbonating gas are projected into the liquid in the chamber A.

Means is provided for defrosting or preventing accumulations of frost or ice in the vent for the chamber A. For this purpose, relatively warm incoming water from the supply is caused to contact the vent tube 16 as the water flows into the chamber A, and this is effected by providing a water circulating chamber 10a in the water inlet passage 10, through which passes a portion of the vent pipe between the end of the vent tube 16 and the check valve 18. The warm water will sufficiently heat the vent tube to prevent accumulation of frost or ice in the vent opening in the tube.

While any suitable pressure reducing or regulating valve may be utilized for reducing the pressure of the high pressure gas from, for example 135 p.s.i. to 60 p.s.i., there is provided a valve which comprises a cup-shaped valve element 70 slidably mounted in a valve chamber 71 at the high pressure gas side of a valve seat at the other side of which is the low pressure gas passage 35. The high pressure gas passage 34 opens directly into said chamber, a restricted duct 78 leads from low pressure passage 35 to the diaphragm chamber 79 to at one side of a flexible diaphragm 73. The valve element is normally pressed against its seat by a spring 72 interposed between the valve element and an abutment plate 81. The flexible diaphragm 73 is clamped between a cap plate 77 and the block I and is abutted at one side by one end of a regulating spring 75 the other end of which engages a regulating cap 76 screwed into cap plate 77. The opposite side of the diaphragm engages one end of a pin 80 slidable in the block with its other end abutting the valve element. The valve 70, 71 controls the flow of gas from the passage 34 to the passage 35.

It is desirable that the magnet M be adjustable toward and away from the switch contacts 45 and this is effected by the rotation of the mounting 52. Preferably set screws 78 or other suitable means are provided for locking the member 52 in adjusted position, the screws being threaded into the mounting member and attached to abut the underside of the housing top wall.

I claim:

1. A carbonating apparatus comprising a housing having a reservoir-carbonating chamber with an inlet duct having an inwardly opening check valve for liquid under pressure from a supply of liquid to be carbonated, means including control valves and check valves for admitting gas under pressure into said reservoir-carbonating chamber adjacent the bottom thereof and for venting gas from said chamber to the atmosphere, alternately, a closed mixing-dispensing chamber, means establishing communication between said reservoir-carbonating chamber and said mixing-dispensing chamber including an outlet pipe in the reservoir-carbonating chamber communicating with an inlet passage to said mixing-dispensing chamber adjacent the top thereof above the liquid level therein and a check valve between said outlet pipe and said inlet passage, means including a supply pipe for a carbonating gas under constant high pressure providing for supply of carbonating gas to said reservoir-carbonating chamber under control of the first-named means at a pressure substantially greater than the pressure of the liquid supply to force the liquid from said reservoir-carbonating chamber into said mixing-dispensing chamber, means connected to said supply pipe independently of the first-mentioned control valves and including a restricted duct providing for constant supply of carbonating gas from said supply pipe through said restricted duct to said mixing-dispensing chamber at a low pressure substantially less than the gas pressure supplied to said reservoir-carbonating chamber, and discharge means for said mixing-dispensing chamber including a discharge pipe with its entrance end adjacent the bottom of said chamber and a discharge valve at the the other end of said pipe.

2. A carbonating apparatus as defined in claim 1 with the addition of means for causing actuation of said control valve simultaneously to permit flow of carbonating gas into said reservoir-carbonating chamber when the carbonated liquid in said mixing-dispensing chamber moves from a predetermined high level to a predetermined low level and thereby force liquid from the reservoir-carbonating chamber into said mixing-dispensing chamber and to cut off carbonating gas from said reservoir-carbonating chamber and simultaneously vent gas therefrom when the carbonated liquid in said mixing dispensing chamber returns to said predetermined high level and thereby permit liquid to be carbonated to enter said reservoir-carbonating chamber, the last-named means being constructed to cut off the supply of carbonating gas to said reservoir-carbonating chamber when the liquid in the mixing-dispensing chamber drops below said predetermined low level while the supply of gas continues through said restricted duct to said mixing-dispensing chamber.

3. A carbonating apparatus as defined in claim 2 wherein the means for causing actuation of said control valve includes a solenoid for actuating said valves, a switch for controlling energization and deenergization of said solenoid upon closing and opening of the switch, and means including a float responsive to the liquid level in said mixing-dispensing chamber for controlling opening and closing of said switch.

4. A carbonating apparatus as defined in claim 2 wherein said discharge pipe has a vent opening above its entrance end to permit venting of gas from the mixing-dispensing chamber and thereby to allow liquid to enter from said reservoir-carbonating chamber until the liquid reaches a predetermined level in the mixing-dispensing chamber.

5. A carbonating apparatus as defined in claim 2 wherein the means for causing actuation of said control valve includes a solenoid for actuating said valves, a switch for controlling energization and deenergization of said solenoid upon closing and opening of the switch, and means including a float responsive to the level in said mixing-dispensing chamber for controlling opening and closing of said switch, and wherein said discharge pipe has a vent opening above its entrance end to permit venting of gas from the mixing-dispensing chamber and thereby to allow liquid to enter from said reservoir-carbonating chamber until the liquid reaches a predetermined level in the mixing-dispensing chamber to raise said float to close said switch and thereby restore gas supply to said reservoir-carbonating chamber.